US009808791B2

(12) United States Patent
Tokudome et al.

(10) Patent No.: US 9,808,791 B2
(45) Date of Patent: Nov. 7, 2017

(54) VISIBLE-LIGHT PHOTOCATALYST PARTICLES AND METHOD FOR MANUFACTURING SAME

(71) Applicant: TOTO LTD., Kitakyushu-shi, Fukuoka (JP)

(72) Inventors: Hiromasa Tokudome, Kanagawa-ken (JP); Sayuri Okunaka, Kanagawa-ken (JP)

(73) Assignee: Toto Ltd., Fukuoka (JP)

( * ) Notice: Subject to any disclaimer, the term of this patent is extended or adjusted under 35 U.S.C. 154(b) by 245 days.

(21) Appl. No.: 14/404,561

(22) PCT Filed: May 29, 2013

(86) PCT No.: PCT/JP2013/065519
§ 371 (c)(1),
(2) Date: Nov. 28, 2014

(87) PCT Pub. No.: WO2013/180307
PCT Pub. Date: Dec. 5, 2013

(65) Prior Publication Data
US 2015/0107984 A1    Apr. 23, 2015

(30) Foreign Application Priority Data

May 29, 2012 (JP) .................. 2012-122042
Sep. 21, 2012 (JP) .................. 2012-207784

(51) Int. Cl.
*B01J 23/58* (2006.01)
*C01B 3/04* (2006.01)
(Continued)

(52) U.S. Cl.
CPC ............ *B01J 23/58* (2013.01); *B01J 19/127* (2013.01); *B01J 21/063* (2013.01); *B01J 23/464* (2013.01);
(Continued)

(58) Field of Classification Search
CPC ........ B01J 23/58; B01J 19/127; B01J 35/023; B01J 35/004; B01J 23/464; B01J 21/063;
(Continued)

(56) References Cited

U.S. PATENT DOCUMENTS

2007/0249497 A1* 10/2007 Tanaka ................ B01D 53/945
502/327

FOREIGN PATENT DOCUMENTS

NL    EP 2407419 A1 *  1/2012 ............. C01B 3/042

OTHER PUBLICATIONS

Shen et al., "Photocatalytic activity of hydrogen evolution over Rh doped SrTiO3 prepared by polymerizable complex method," Chemical Engineering Journal 223 (2013) 200-208. Published online Mar. 13, 2013.*
(Continued)

*Primary Examiner* — Anthony J Zimmer
(74) *Attorney, Agent, or Firm* — Joseph P. Carrier; Anne G. Sabourin

(57) ABSTRACT

Disclosed is a visible light responsive photocatalyst that simultaneously realizes high crystallinity and refinement of primary particles. Also disclosed is a photocatalyst composed of secondary particles that have a high porosity and are aggregates of fine primary particles. Rhodium-doped strontium titanate that is a visible light responsive photocatalyst of the present invention has a primary particle diameter of not more than 70 nm and has a absorbance at a wavelength of 570 nm of not less than 0.6 and a absorbance at a wavelength of 1800 nm of not more than 0.7, each absorbance determining by measuring a diffuse reflection spectrum, the rhodium-doped strontium titanate having a high water-splitting activity as a photocatalyst.

11 Claims, 3 Drawing Sheets

(51) Int. Cl.
*C01B 3/06* (2006.01)
*C01G 23/00* (2006.01)
*B82Y 30/00* (2011.01)
*B01J 37/03* (2006.01)
*B01J 21/06* (2006.01)
*B01J 23/46* (2006.01)
*B01J 35/00* (2006.01)
*B01J 35/02* (2006.01)
*B01J 37/02* (2006.01)
*B01J 19/12* (2006.01)

(52) U.S. Cl.
CPC ........... *B01J 35/004* (2013.01); *B01J 35/023* (2013.01); *B01J 37/0211* (2013.01); *B01J 37/033* (2013.01); *B01J 37/036* (2013.01); *B82Y 30/00* (2013.01); *C01B 3/04* (2013.01); *C01B 3/042* (2013.01); *C01B 3/06* (2013.01); *C01G 23/006* (2013.01); *C01P 2002/50* (2013.01); *C01P 2002/54* (2013.01); *C01P 2004/03* (2013.01); *C01P 2004/04* (2013.01); *C01P 2004/64* (2013.01); *Y02E 60/364* (2013.01)

(58) Field of Classification Search
CPC .... B01J 37/036; B01J 37/033; B01J 37/0211; C01B 3/04; C01B 3/042; C01B 3/06; B82Y 30/00; C01G 23/006; C01P 2002/50; C01P 2004/64; C01P 2004/04; C01P 2004/03; C01P 2002/54; Y02E 60/364
See application file for complete search history.

(56) References Cited

OTHER PUBLICATIONS

Extended European Search Report dated Jul. 5, 2016 corresponding to European Patent Application No. 13 79 7998.5.
Bae et al., "Dopant dependent band gap tailoring of hydrothermally prepared cubic $SrTi_xM_{1-x}O_3$ (M=Ru, Rh, Ir, Pt, Pd) nanoparticles as visible light photocatalysts" Applied Physics Letters, Mar. 14, 2008, pp. 104107-1-104107-3, vol. 92, Issue 10.

\* cited by examiner

US 9,808,791 B2

VISIBLE-LIGHT PHOTOCATALYST PARTICLES AND METHOD FOR MANUFACTURING SAME

FIELD OF INVENTION

The present invention relates to a visible light responsive photocatalyst particle and a process for producing the same.

BACKGROUND ART

Visible light responsive photocatalysts are photocatalysts that can utilize visible light, contained in a large amount in sunlight. The visible light responsive photocatalysts are expected to be applied to photodecomposition of organic substances and hydrogen production by photolysis of water. In particular, photocatalysts for splitting water have drawn attention as photocatalysts for producing hydrogen by utilizing the renewable energy. As a result, there is an ever-increasing demand for highly active photocatalysts for splitting water.

Rhodium-doped strontium titanate (Rh—$SrTiO_3$) as a visible light responsive photocatalyst for splitting water is known to have a very high capability of generating hydrogen by photolysis of water. A Z-scheme system of a combination of Rh—$SrTiO_3$ with a photocatalyst for oxygen generation is known to provide a high energy conversion efficiency in a water splitting reaction (Japanese Patent Application Laid-Open No. 2004-008963 (PTL 1) and Sasaki et al., J. Phys. Chem. C 17536-17542 pages, 2009 (NPTL 1)).

The above Rh—$SrTiO_3$ has hitherto been prepared by a solid-phase reaction method or a hydrothermal synthesis method. In these methods, it is known that a treatment is carried out that includes firing a material at about 1000° C. to render the material highly crystalline. Rh—$SrTiO_3$ particles thus obtained are known to have a primary particle diameter of approximately several hundred nanometers to a few micrometers and have a high hydrogen generation capability under visible light irradiation. Rh—$SrTiO_3$ particles are required to be in a microcrystalline form to have an increased specific surface area so that Rh—$SrTiO_3$ particles are highly activated.

CITATION LIST

Patent Literature

[PTL 1] JP 2004-008963A
[PTL 2] JP 2012-056947A

Non Patent Literature

[NPTL 1] Sasaki et al., J. Phys. Chem. C 17536-17542, 2009

SUMMARY OF THE INVENTION

Problems to be Solved by the Invention

In view of the above problems, the present invention has been made. An object of the present invention is to provide rhodium-doped strontium titanate particles that have high crystallinity as well as refined primary particles.

Means for Solving the Problems

According to the present invention, there are provided rhodium-doped strontium titanate particles having a primary particle diameter of not more than 70 nm and having an absorbance at a wavelength of 570 nm of not less than 0.6 and an absorbance at a wavelength of 1800 nm of not more than 0.7, each absorbance being determined by measuring a diffuse reflection spectrum.

Effect of the Invention

The rhodium-doped strontium titanate particles according to the present invention have a high photocatalytic activity under visible light irradiation.

EMBODIMENTS OF THE INVENTION

Crystallinity of Rhodium-Doped Strontium Titanate Particles

Figure 1:
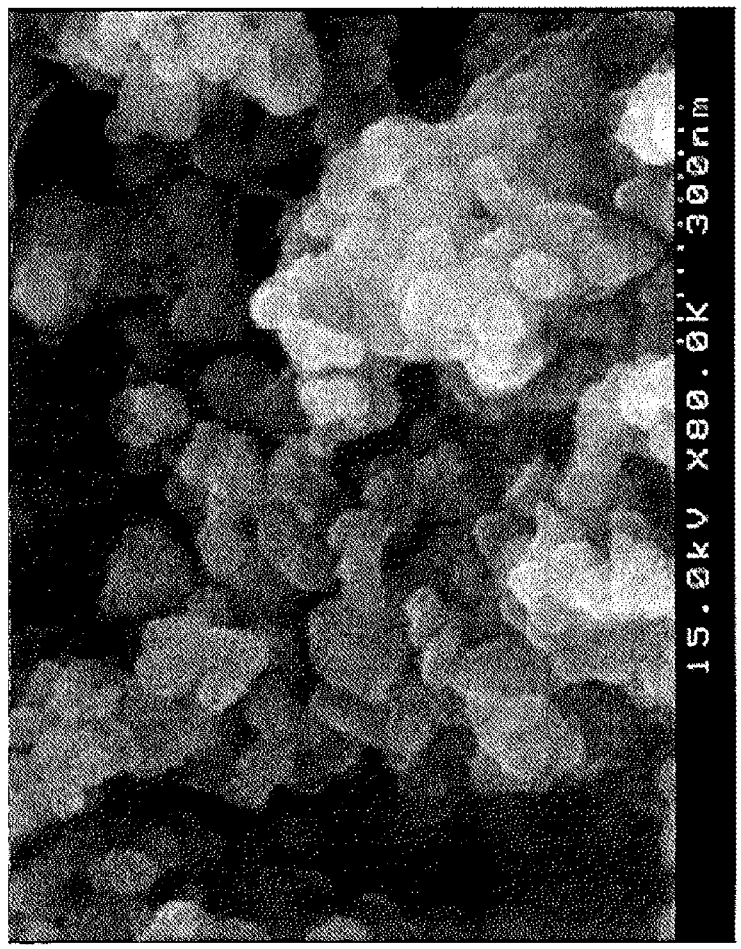
FIG. 1 is a scanning electron microscopic photograph of rhodium-doped strontium titanate particles according to the present invention.

The rhodium-doped strontium titanate (Rh—$SrTiO_3$) particles according to the present invention are characterized by high crystallinity and small primary particle diameter.

The present inventors have found that particles that have a larger absorbance derived from $Rh^{4+}$ in crystals as well as a smaller absorbance derived from oxygen defects present in crystals as compared with conventional rhodium-doped strontium titanate particles, have a high crystallinity and a high photocatalytic activity. However, it is difficult for Rh—$SrTiO_3$ to have a high crystallinity as well as to be in a refined crystal form with a large specific surface area. Practically it is difficult to grow a crystal of Rh—$SrTiO_3$ with a high crystallinity while refinement of the crystal is maintained. An absorbance derived from $Rh^{4+}$ in crystals and an absorbance derived from oxygen defects present in crystals can be used as an index to determine Rh—$SrTiO_3$ particles, the crystals of which are microcrystals and have a high crystallinity.

The formation of oxygen defects is generally considered as one cause of a lowering in crystallinity of metal oxides. The larger the number of oxygen defect sites in metal oxides, that is, the larger the number of oxygen defects, the lower the degree of crystallization of metal oxides, that is, the lower the crystallinity, due to disturbance of periodicity of crystals.

The number of oxygen defects of the rhodium-doped strontium titanate particles according to the present invention can be determined using absorbance A (=1-spectral reflectance R) as an index. The absorbance A can be quantitatively determined by diffuse reflection spectrum measurement of powders of rhodium-doped strontium titanate particles in the ranges of ultraviolet light, visible light, and near-infrared light. Oxygen defects present in metal oxides, for example, titanium oxide, cause a donor level of $Ti^{3+}$. The donor level of $Ti^{3+}$ is caused in a range of an electron energy that is lower by approximately 0.75 to 1.18 eV from the lower end of a conduction band composed of Ti-3d orbital in a band structure of titanium oxide. Further, an absorption spectrum of titanium oxide having oxygen defects is known to have a absorption band in a range from a visible light to a near-infrared light (Cronemeyer et al., Phys. Rev. No. 113, p 1222-1225, 1959). The present inventors have now confirmed as follows. Measurement of a diffuse reflection spectrum of rhodium-doped strontium titanate particles shows the rhodium-doped strontium titanate particles, as with titanium oxide, have a broad absorption band in a range of a visible light to a near-infrared light. Further, it has been found that, when a set temperature of the firing is raised, the absorbance is reduced in this near-infrared light range. Based on these facts, the present inventors have found that the degree of improvement, in crystallinity provided by raising the firing temperature can be quantified by measuring absorption in a range from a visible light to a near-infrared light.

The present inventors also have found that the state of the rhodium is also important for rhodium-doped strontium titanate particles to have a high photocatalytic activity and the crystallinity increases with increasing absorption derived from tetravalent rhodium ($Rh^{4+}$) in strontium titanate crystals. The following mechanism will demonstrate the effect of valence of rhodium on crystallinity. However, the present invention is not limited to this mechanism.

In general, the valence of rhodium is known to be divalent, trivalent, tetravalent, and pentavalent. Among rhodium having these valences, trivalent rhodium ($Rh^{3+}$) is most stable in the atmosphere with room temperature. When a starting material containing trivalent rhodium is used, it is known that, when strontium titanate ($SrTiO_3$) is fired at high temperatures for crystallization, sites of tetravalent titanium ($Ti^{4+}$) are doped with rhodium. In this case, when crystal site of $Ti^{4+}$ is substitutionally doped with $Rh^{3+}$, oxygen defects disadvantageously occur in order to keep charge neutrality. The present inventors have found that, in order to reduce the oxygen defects, crystal sites of $Ti^{4+}$ should be doped with $Rh^{4+}$ that can maintain the charge neutrality of crystals leading to improved crystallinity of the particles.

Accordingly, the present inventors have found that optical property parameters of rhodium-doped strontium titanate particles having a high photocatalytic activity according to the present invention can be clarified by measuring the particles in the following method.

Methods for the measurement of optical properties of rhodium-doped strontium titanate particles according to the present invention include using an ultraviolet-visible-near-infrared spectrophotometer (manufactured by Japan Spectroscopic Co., Ltd., "V-670") equipped with an integrating sphere unit. Specifically, an integrating sphere unit (manufactured by Japan Spectroscopic. Co., Ltd., "ISV-722") is mounted on the ultraviolet-visible-near-infrared spectrophotometer. Alumina sintered pellets are used in baseline measurement. On that basis, a spectral reflectance R can be determined by measuring a diffuse reflection spectrum of a sample prepared by filling 30 mg of particle powder into a window portion (5 mmφ) in a trace powder cell (manufactured by Japan Spectroscopic Co., Ltd., "PSH-003") at a filling fraction of not less than 50%. The optical properties of rhodium-doped strontium titanate particles are determined by measuring a diffuse reflection spectrum in a wavelength range of 200 to 2500 nm with the spectrophotometer. The rhodium-doped strontium titanate particles according to the present invention are characterized in that absorbance $A_{570}$ at wavelength 570 nm ($=1-R_{570}$[spectral reflectance at wavelength 570 nm]), attributed to light absorption derived from $Rh^{4+}$ in strontium titanate crystals, is not less than 0.8, and absorbance $A_{1800}$ at wavelength 1800 nm ($=1-R_{1800}$[spectral reflectance at wavelength 1800 nm]), attributed to light absorption derived from oxygen defects in crystals is not more than 0.7, where the two absorbances are determined under conditions that absorbance $A_{315}$ at wavelength 315 nm ($=1-R_{315}$[spectral reflectance at wavelength 315 nm]) is in the range of 0.86 to 0.87. In a preferred embodiment of the present invention, the absorbance $A_{570}$ at wavelength 570 nm is 0.6 (inclusive) to 0.8 (exclusive). In another preferred embodiment of the present invention, the absorbance $A_{1800}$ at wavelength 1800 nm is 0.3 (inclusive) to 0.7 (inclusive).

Primary Particle Diameter of Rhodium-Doped Strontium. Titanate Particles

Further, as described above, the rhodium-doped strontium titanate particles according to the present invention has a very small primary particle diameter. The primary particle diameter is not more than 70 nm. This small primary particle diameter allows the rhodium-doped strontium titanate particles to have a high specific surface area. Further, the area of contact with a substance to be decomposed increases, resulting in a high photocatalytic activity of the particles. Preferably, the primary particle diameter is not more than 50 nm. More preferably, the primary particle diameter is 30 nm (inclusive) to 70 nm (inclusive). Still more preferably, the primary particle diameter is 30 nm (inclusive) to 50 nm (inclusive). The primary particle diameter of the rhodium-doped strontium titanate particles is defined as the averaged diameter of the 50 particles in observation, each of which is approximated by a circle at a magnification of 40,000 times under, for example, a scanning electron microscope (manufactured by Hitachi, Ltd., "S-4100," hereinafter referred to as SEM).

Structure of Rhodium-Doped Strontium Titanate Particles

In a preferred embodiment of the present invention, as described above, the rhodium-doped strontium titanate particles according to the present invention have a large specific surface area.

In the present invention, use of an $R_{SP}$ value of the rhodium-doped strontium titanate particles as an index has identified that the rhodium-doped strontium titanate particles have a large surface area and that a secondary particle, that is, a powder, has a high porosity wherein the secondary particle is made of the rhodium-doped strontium titanate particles.

The $R_{SP}$ value is an index correlated with the amount of water molecules adsorbed on the surface of particles and thereby depends upon a surface area of particles in contact with water when the particles are dispersed in water. As described later, the rhodium-doped strontium titanate particles according to the present invention can be utilized as a photocatalyst for splitting water when the particles are in contact with water. In this case, water permeates gaps among primary particles or pores within a secondary particle, and thus the surface of the particles is into contact with water. Accordingly, when the rhodium-doped strontium titanate particles according to the present invention are utilized as a photocatalyst for splitting water, use of the $R_{SP}$ value as an index to determine the surface area of particles on which water is adsorbed is useful in obtaining particles having a large specific surface area. A method for the measurement of the specific surface area of particles includes a BET analysis based on nitrogen adsorption and desorption measurement, as a main conventional method. In this BET analysis, however, nitrogen is used as a probe, and the molecular diameter of nitrogen is so small that nitrogen is disadvantageously adsorbed on the surface of pores that water cannot permeate. The method for the measurement of the specific surface area by a BET analysis is not effective when the object is particles with water adsorbed thereon.

The $R_{SP}$ value is represented by the following equation. Further, the $R_{SP}$ value can be measured with a pulse NMR particle boundary evaluation apparatus (for example, "Acorn area," manufactured by Nihon Rufuto Co., Ltd).

$$R_{SP}=(R_b-R_{av})/R_b \qquad (1)$$

wherein $R_{av}$ is a mean relaxation time constant. The relaxation time constant is an inverse number of a relaxation time of water in contact with or adsorbed on the surface of particles when the particles are dispersed in water. The mean relaxation time constant is a mean value of determined relaxation time constants.

$R_b$ is a relaxation time constant of blank water not containing particles.

The larger the $R_{sp}$ value, the larger the interaction of the surface of particles with water. This means that a large $R_{sp}$ indicates a large contact area between particles and water, and thus a large specific surface area of particles.

The $R_{SP}$ value of the rhodium-doped strontium titanate particles according to the present invention is preferably not less than 0.86, more preferably not less than 0.88. The $R_{SP}$ value is preferably not more than 10.

Composition of Rhodium-Doped Strontium Titanate

The composition of rhodium-doped strontium titanate according to the present invention may be represented by $SrTi_{1-x}Rh_xO_3$. The molar ratio represented by M(rhodium)/M(titanium+rhodium) of the rhodium-doped strontium titanate particles is preferably 0.001 to 0.03, more preferably 0.01 to 0.03. The molar ratio in this range allows an increase in the amount of oxygen defects in crystals to be suppressed and thus a high photocatalytic activity is achieved.

As described above, the rhodium-doped strontium titanate particles according to the present invention, which have the absorbance as described above as well as the very fine primary particle shape, which is measured with SEM have a high photocatalytic activity.

Process for Producing Rhodium-Doped Strontium Titanate Particles

A dry reaction method and a wet reaction method may be utilized as a production process of the rhodium-doped strontium titanate particles according to the present invention. Dry reaction methods include solid-phase reaction methods. Wet reaction methods include sol-gel methods, polymerized complex methods and hydrothermal reaction methods. For example, in the production of the rhodium-doped strontium titanate particles by the sol-gel method, alkoxides of titanium or chlorides of titanium are used as a starting material. A hydroxide containing titanium is produced by a hydrolytic reaction of the starting material with water. Rhodium-doped strontium titanate particles are obtained by firing the hydroxide at 600° C. or above for crystallization.

Production of Particles Using Aqueous Solution Containing Precursor of Rhodium-Doped Strontium Titanate Further, for the production of the rhodium-doped strontium titanate particles according to the present invention, a thermal decomposition method (a thermal decomposition method using an aqueous solution) can be preferably employed using an aqueous solution containing strontium ions, titanium ions and rhodium ions. The thermal decomposition method using an aqueous solution includes providing a metal-containing precursor as a starting material and heating an aqueous solution containing the metal-containing precursor to induce a dehydration polycondensation reaction between metal-containing precursors with the evaporation of water as the solvent. In the sol-gel method using metal compounds (for example, alkoxides of metals or chlorides of metals and the like) that tend to be rapidly hydrolyzed with water, metal hydroxides are produced by hydrolysis between metal-containing precursors, and the dehydration polycondensation rapidly occurs, probably leading to coarsening of crystal nuclei. On the other hand, in the thermal decomposition method using an aqueous solution used in the present invention, since metal-containing precursors that tend to be mildly hydrolyzed are used as the starting material, stable dissolution in water is ensured. Further, when the aqueous solution containing the metal-containing precursor is heated, water as the solvent is evaporated to mildly cause a dehydration polycondensation reaction between metal-containing precursors. Consequently, the generation speed of crystal nuclei during thermal decomposition is lowered, and, thus refinement of crystal nuclei is achieved.

In one embodiment of the present invention, preferably, in the production process of the present invention, an aqueous solution containing a rhodium-doped strontium titanate precursor is prepared by mixing a titanium compound, a strontium compound, a rhodium compound and a hydrophobic complexing agent together to prepare a mixture and dissolving the mixture in water. The aqueous solution thus obtained is hereinafter referred to as an aqueous solution A. The rhodium-doped strontium titanate precursor is a mixture of a compound having a six-membered ring structure formed by coordinating a hydrophobic complexing agent to titanium ions generated as a result of dissociation of the titanium compound, strontium ions generated as a result of dissociation of a strontium compound and rhodium ions generated as a result of dissociation of a rhodium compound. In the preparation of the aqueous solution A, a titanium compound and a hydrophobic complexing agent are mixed together to prepare an aqueous solution containing a water-soluble titanium complex (an aqueous solution thus obtained being referred to as aqueous solution B). A strontium compound and a rhodium compound are mixed into the aqueous solution B to prepare an aqueous solution containing a rhodium-doped strontium titanate precursor, that is, the solution A. The water-soluble titanium complex is one in which a hydrophobic complexing agent has been coordinated to titanium ions generated as a result of dissociation of the titanium compound.

In the production process of the present invention, preferably, in addition to the titanium compound, a hydrophobic complexing agent is added as the starting material from the viewpoint of rendering a $Ti^{4+}$-containing titanium compound (that is originally sparingly soluble in water) soluble in water. Hydrolysis can be suppressed by coordinating the hydrophobic complexing agent to titanium ions for complexing of the titanium ions. Alkoxides of titanium and chlorides of titanium may be used as the titanium compound. Alkoxides of titanium include titanium tetramethoxide, titanium tetraethoxide, titanium tetra-n-propoxide, titanium tetraisopropoxide, and titanium tetra-n-butoxide and others. Chlorides of titanium include titanium tetrachloride, titanium tetrafluoride and titanium tetrabromide.

Further, the hydrophobic complexing agent used in the present invention can be coordinated to titanium ions, allowing a hydrophobic portion to be exposed to a solvent phase side of the water-soluble titanium complex. Preferred hydrophobic complexing agents include diketone compounds and catechol compounds. Preferred diketone compounds are diketone compounds represented by general formula: $Z_1—CO—CH_2—CO—Z_2$ wherein $Z_1$ and $Z_2$ independently represent an alkyl or alkoxy group. Preferred diketone compounds represented by the above general formula include acetylacetone, ethyl acetoacetate, propyl acetoacetate, butyl acetoacetate and others. Preferred catechol compounds include ascorbic acid, pyrocatechol, tert-butylcatechol and others. Still more preferably, acetylacetone and ethyl acetoacetate that have a very high complexing capability of being coordinated to titanium are used. This can suppress intermolecular polymerization by intermolecular dehydration polycondensation that occurs when a hydroxyl group that is a hydrophilic portion is exposed to a solvent phase side. Therefore, in thermal decomposition, refinement of crystal nuclei and refinement of particles after a thermal decomposition reaction are achieved.

In a preferred embodiment of the present invention, in addition to the hydrophobic complexing agent, a hydrophilic complexing agent may also be used. The hydrophilic complexing agent is preferably a carboxylic acid, more preferably a carboxylic acid represented by formula $R^1$—COOH wherein $R^1$ represents a $C_{1-4}$ alkyl group, or a hydroxy acid or dicarboxylic acid having 1 to 6 carbon atoms. Such hydrophilic complexing agents include water-soluble carboxylic acids such as acetic acid, lactic acid, citric acid, butyric acid, and malic acid. Still more preferred water-soluble carboxylic acids are acetic acid or lactic acid. This achieves the suppression of a hydrolytic reaction of the titanium compound or an improvement in solubility of the titanium compound in water.

The solvent for complex formation may be water. In another preferred embodiment of the present invention, water-soluble organic solvents may be used as the solvent. Use of the water-soluble organic solvents can improve the solubility of the transition metal compound. Specific examples of water-soluble organic solvents include methanol, ethanol, n-propanol, isopropanol, cellosolve-based solvents and carbitol-based solvents.

In a preferred embodiment of the present invention, the water-soluble titanium complexes may be those described in JP 2012-056947A. Specifically, titanium complexes with the number of coordinations to titanium ions being 6 are usable. Such titanium complexes comprise titanium ions; a first ligand that is represented by $Z_1$—CO—$CH_2$—CO—$Z_2$ wherein $Z_1$ and $Z_2$ independently represent an alkyl or alkoxy group and further functions as a bidentate ligand; a second ligand that is a carboxylate; third and fourth ligands that are independently selected from the group of alkoxides and hydroxide ions; and a fifth ligand that is $H_2O$, each of which is coordinated to the titanium ions.

Preferably the $Sr^{2+}$-containing strontium compound is soluble in water does not retain a residue of anion component upon heat crystallization. Preferred are, for example, strontium nitrate, strontium acetate, strontium chloride, strontium bromide, strontium lactate, strontium citrate and others.

The $Rh^{3+}$-containing rhodium compound is preferably soluble in water and, upon heat crystallization, does not retain a residue of anion component. The rhodium compounds include rhodium nitrate, rhodium nitrate, rhodium chloride, rhodium bromide, rhodium lactate, rhodium citrate. $Rh^{4+}$-containing molecules may be used as the rhodium compound. Hydrophilic complexing agents such as lactic acid, butyric acid, and citric acid and others may be used for the purpose of improving the solubility of the strontium compound or the rhodium compound in water.

In the production of the rhodium-doped strontium titanate particles according to the present invention, preferably, the mixing ratio of various starting materials in the aqueous solution A is 0.01 to 0.2 mole, more preferably 0.02 to 0.1 mole, per 100 g of water for the titanium compound containing one atom of titanium, is 1 to 1.1 times by mole larger than the titanium compound containing one atom of titanium for the strontium compound, is a desired doping amount for the rhodium compound, is 0.005 to 0.4 mole, more preferably 0.015 to 0.15 mole, for the hydrophobic complexing agent, and is 0.01 to 0.2 mole, more preferably 0.025 to 0.15 mole, for the hydrophilic complexing agent. When the starting materials are respectively mixed at the above mixing ratio, the titanium compound is well rendered soluble in water and a high degree of crystallization and refinement of particles after thermal decomposition are possible. The molar ratio of the hydrophobic complexing agent to the titanium compound is preferably 0.5 to 2 mole, more preferably 0.8 to 1.2, per mole of the titanium compound containing one atom of titanium. The molar ratio in the above-defined range allows the progress of a hydrolytic reaction of the titanium compound and the decrease in water solubility caused by hydrophobicity of molecules of the titanium compound to be suppressed. The molar ratio of the hydrophilic complexing agent to the titanium compound is preferably 0.2 to 2 moles, more preferably 0.3 to 1.5 moles, per mole of the titanium compound containing one atom of titanium. The molar ratio in the above-defined range allows to suppress the progress of a hydrolytic reaction of the titanium compound and improve the solubility of the titanium compound in water. In the aqueous solution A, the pH value that can maintain stability of individual ions in the aqueous solution and can realize the refinement of particles after crystallization is preferably 2 to 6, more preferably 3 to 5. The pH value in the above-defined range allows coarsening of crystals caused by the promotion of a hydrolytic polycondensation which promotion is developed under a strong acid or strong alkali atmosphere to be suppressed.

Further, in the production of the rhodium-doped strontium titanate particles according to the present invention, preferably, water dispersible organic polymer particles are added to the aqueous solution A (a liquid obtained by adding water dispersible organic polymer particles to the aqueous solution A being hereinafter referred to as dispersion). A powder of rhodium-doped strontium titanate particles can be obtained by heating the dispersion for crystallization. The addition of water-dispersible organic polymer particles to the aqueous solution A can reduce the degree of aggregation of the rhodium-doped strontium titanate particles to increase the porosity or the void ratio of a powder of the rhodium-doped strontium titanate particles.

Spherical latex particles or an oil-in-water (O/W) emulsion can be used as the water-dispersible organic polymer particles. Fine rhodium-doped strontium titanate particles are obtained by adding the water-dispersible organic polymer particles. A secondary particle, an aggregation of the such particles, is porous. A mechanism through which such fine primary particles are obtained and, consequently, the porosity of secondary particles obtained by the aggregation thereof becomes high will be as follow. However, the scope of the present invention is not limited to this mechanism. The addition of the water-dispersible organic polymer particles allows the water-soluble titanium complex, strontium ions and rhodium ions, which are polar molecules, to be adsorbed to the surface of the polymer particles that are polar in water. In a process of heat crystallization, the titanium complex present on the surface of the polymer particles is hydrolyzed to produce crystal nuclei of rhodium-doped strontium titanate. Since the crystal nuclei on the surface of the polymer particles are present with a physical distance therebetween, there is little opportunity of bonding among the crystal nuclei and, consequently, the growth of crystals proceeds slowly, leading to a small primary particle diameter of the rhodium-doped strontium titanate particles.

Further, it is considered that, although the formed rhodium-doped strontium titanate particles are bound to one another as a result of the disappearance of polymer particles by thermal decomposition, the presence of the polymer particles suppresses the aggregation of the rhodium-doped strontium titanate particles, resulting in an increase in void ratio of secondary particles as an aggregate, that is, an increase in porosity.

The dispersed diameter of the water-dispersible organic polymer particles is preferably 10 to 1000 nm, more preferably 30 to 300 nm. The dispersed particles diameter in the above-defined range allows the physical distance among the crystal nuclei of rhodium-doped strontium titanate to be increased. Thus, after the heat crystallization, the rhodium-doped strontium titanate particles can be refined. Further, the water-dispersible organic polymer particles are preferably formed of a material that, after heat crystallization at 600° C. or above, does not retain a residue of amorphous carbon or the like, which is a residue of the organic polymer particles. Suitable materials include polymerization products of monomer units of styrene, acryl, urethane, epoxy or the like, or polymerization products of a plurality of the monomer units. The addition amount of the water-dispersible organic polymer particles is preferably 1 to 20 times, more preferably 3 to 15 times larger than that of the weight of rhodium-doped strontium after crystallization at high temperatures. The addition of the amount of the polymer particles in the above-defined range to the aqueous solution A allows the aggregation of the particles after the crystallization to be suppressed and thus the primary particle diameter of the particles is reduced.

In the production process of the present invention, the following method is preferably used as a method for the preparation of the rhodium-doped strontium titanate particles from the dispersion. At the outset, a dried powder is obtained by drying the dispersion at a low temperature of 200° C. or below. Rhodium-doped strontium titanate particles can be produced by firing the dried powder for crystallization. The step of drying the dispersion can be followed by the step of firing the dried powder without interval. The firing temperature for the crystallization of rhodium-doped strontium titanate is 800° C. (exclusive) to 1100° C. (exclusive), more preferably 900° C. (inclusive) to 1050° C. (inclusive). The firing temperature in the above-defined range allows highly pure rhodium-doped strontium titanate particles to be highly crystallized while the water-dispersible organic polymer particles are thermally decomposed.

Use of Photocatalyst

When the rhodium-doped strontium titanate particles according to the present invention are used in photolysis of water as a photocatalyst, preferably, the co-catalyst is supported on the surface of the particles so that hydrogen and oxygen are rapidly generated. Co-catalysts usable herein include metal particles such as platinum, ruthenium, iridium, and rhodium, and metal oxides particles such as chromium oxide, rhodium oxide, iridium oxide, and ruthenium oxide. Further, a mixture of metal particles with metal oxide particles may be used. The rhodium-doped strontium titanate particles with the co-catalyst supported thereon allows the activation energy in water oxidation reaction and water reduction reaction to be reduced and, thus, hydrogen and oxygen can be rapidly generated.

Further, the rhodium-doped strontium titanate particles and a photocatalyst for oxygen generation can constitute a Z scheme system in which a suitable redox couple (for example, $Fe^{2+}/Fe^{3+}$, $I^-/I_3^-$, $I^-/IO_3^-$, or $Co^{2+}/Co^{3+}$) is dissolved in water. The Z scheme system can completely split water under visible light irradiation. Preferably the photocatalyst for oxygen generation in the present invention includes $BiVO_4$ and $WO_3$.

Thus, according to one aspect of the present invention, there is provided use of the rhodium-doped strontium titanate particles as a photocatalyst for splitting water. Further, according to another aspect of the present invention, there is provided a method for water splitting, which method comprises irradiating rhodium-doped strontium titanate particles with visible light where the rhodium-doped strontium titanate particles are in contact with water.

EXAMPLES

The present invention is further illustrated by the following Examples which are not intended as a limitation of the scope of the present invention.

Examples 1 to 11

Preparation of Rhodium-Doped Strontium Titanate Particles 0.02 mol (2.003 g) of acetylacetone (manufactured by Wako Pure Chemical Industries, Ltd.) as a hydrophobic complexing agent was added to a 20-mL sample bottle, and 0.02 mol (5.684 g) of titaniumtetraisopropoxide (manufactured by Wako Pure Chemical Industries, Ltd.) was added thereto with stirring at room temperature to prepare a yellow solution containing a water-soluble titanium complex. The solution containing the water-soluble titanium complex was added to 50 mL of a 0.32 mol/L aqueous acetic acid solution with stirring at room temperature to prepare a mixture. After the addition, the mixture was stirred at room temperature for about one hr and then at 60° C. for about one hr to prepare an aqueous solution containing a yellow transparent water-soluble titanium complex.

A portion (10 g) of the aqueous solution containing the water-soluble titanium complex prepared above was then taken (containing 3.41 mmol of titanium in terms of metallic titanium). A solution of 3.75 mmol (0.84 g) of strontium acetate 0.5 hydrate (manufactured by Wako Pure Chemical Industries, Ltd.) and 0.70 g of lactic acid (manufactured by Wako Pure Chemical Industries, Ltd.) as a hydrophilic complexing agent, dissolved in 3.16 g of distilled water was added to the portion (10 g) of the aqueous solution to prepare a mixed aqueous solution, and, further, a 5 wt % aqueous solution of rhodium trichloride (manufactured by Wako Pure Chemical Industries, Ltd.) was added to the mixed aqueous solution so that the concentration in terms of the molar ratio of M(rhodium) to M(titanium+rhodium) was a desired value, followed by stirring at room temperature for 3 hr. Thus, the mixed aqueous solution containing a precursor of an orange-colored transparent rhodium-doped strontium titanate was obtained. The mixed aqueous solution had a pH value of about 4.

Further, an acryl-styrene-based O/W emulsion (manufactured by DIC, "EC-905EF," dispersed particle diameter 100 to 150 nm, pH: 7 to 9, solid content 49 to 51%) was added as water-dispersible organic polymer particles to the mixed aqueous solution so that the amount of acryl-styrene-based O/W emulsion was five times that of rhodium-doped strontium titanate obtained after firing in terms of weight ratio.

The dispersion prepared above was dried at 80° C. for one hr and was fired at a firing temperature specified in Table 1 for 10 hr to prepare powders of rhodium-doped strontium titanate particles of Examples 1 to 11.

For a sample of Example 10, a powder after firing at 1000° C. for 10 hr for crystallization as described above was further subjected to fine dispersion with a planetary mill ("Premium Line P-7," manufactured by Fritsch). Regarding dispersion conditions, 1 g of a rhodium-doped strontium titanate powder, 4 g of ethanol, and 1 g of zirconia beads (0.5 mmϕ) were placed in a zirconia pot (capacity 45 mL), and the mixture was subjected to dispersion with a planetary centrifugal mixer at 700 rpm for 30 min. After the dispersion treatment, a slurry with powder dispersed therein was collected by suction filtration through a resin filter having a hole diameter of the mesh of 0.1 mm. The slurry was dried at room temperature for 10 hr for dispersion treatment to prepare a rhodium-doped strontium titanate powder of Example 10.

Example 12

Rhodium-doped strontium titanate particles were prepared in the same manner as in Examples 1 to 11, except that a 50 wt % water dispersion of acryl-based latex particles (Chemisnow 1000, manufactured by Soken Chemical & Engineering Co., Ltd., mean particle diameter about 1000 nm) was used instead of the acryl-styrene-based O/W emulsion.

Example 13

Rhodium-doped strontium titanate particles were prepared in the same manner as in Examples 1 to 11, except that a 50 wt % water dispersion of acryl-based latex particles (Chemisnow 300, manufactured by Soken Chemical & Engineering Co., Ltd., mean particle diameter about 300 nm) was used instead of the acryl-styrene-based O/W emulsion.

Comparative Examples 1 to 6

Rhodium-doped strontium titanate was prepared as a sample of Comparative Example by a conventional solid-phase reaction method. The solid-phase reaction method was carried out as follows.

Powders of strontium carbonate (manufactured by Kanto Chemical Co., Inc.), titanium oxide (manufactured by Soekawa Rikagaku, Ltd., rutile-type), and rhodium oxide ($Rh_2O_3$: manufactured by Wako Pure Chemical Industries, Ltd.) were mixed together at a molar ratio of Sr:Ti:Rh=1.07:1−x:x, wherein x:rhodium dope ratio specified in Table 1. Thereafter, firing was carried out at a firing temperature specified in Table 1 for 10 hr to prepare rhodium-doped strontium titanate powders of Comparative Examples 1 to 6.

Comparative Examples 7 to 11

Rhodium-doped strontium titanate powders of Comparative Examples 7 to 11 were prepared in the same manner as in Example 1, except that the firing temperature for crystallization was those specified in Table 1.

Comparative Example 12

Rhodium-doped strontium titanate was prepared by a polymerized complex method. Specifically, a rhodium-doped strontium titanate powder of Comparative Example 12 was prepared in the same manner as in Example 2, except that a titanium peroxo-citrate complex ("TAS-FINE," manufactured by Furuuchi Chemical Corporation) which is a commercially-available water-soluble titanium complex was used instead of the water-soluble titanium complex.

Comparative Example 13

Rhodium-doped strontium titanate was prepared by a polymerized complex method (lactic acid polymerization method). Specifically, the same procedure of Example 2 was repeated, except that a titanium complex having lactic acid as a ligand was used instead of the water-soluble titanium complex. That is, titanium isopropoxide (manufactured by Wako Pure Chemical Industries, Ltd., 0.01 mol) and lactic acid (manufactured by Wako Pure Chemical Industries, Ltd., 0.02 mol) were added to 100 g of distilled water, and the mixture was stirred at room temperature for one week to prepare an aqueous solution of a lactic acid titanium complex dissolved in water. A rhodium-doped strontium titanate powder of Comparative Example 13 was prepared in the same manner as in Example 2, except that the aqueous solution containing the lactic acid titanium complex was used instead of the aqueous solution of the water-soluble titanium complex.

Comparative Example 14

Rhodium-doped strontium titanate particles were prepared in the same manner as in Examples 1 to 11, except that a 30 wt % aqueous solution of a polyallylamine that is a water-soluble cationic polymer (manufactured by Wako Pure Chemical Industries, Ltd.) was used instead of the acryl-styrene O/W emulsion.

Comparative Example 15

Rhodium-doped strontium titanate particles were prepared in the same manner as in Examples 1 to 11, except that the acryl-styrene O/W emulsion was not added.

Conditions for the preparation of the prepared powders and the properties of the powders are shown in Table 1.

Crystal Structure and Fine Structure of Rhodium-Doped Strontium Titanate Particles Rhodium-doped strontium titanate prepared in Examples 1 to 13 and Comparative Examples 1 to 15 was analyzed by X-ray diffractometry. As a result, all samples were found to have a single-phase perovskite structure. Next, the primary particle diameter of rhodium-doped strontium titanate observed under a scanning electron microscope is shown in Table 1. Specifically, the primary particle diameter was determined by averaging diameter of the 50 particles in observation, each of which was approximated by a circle, at a magnification of 40000 times under a scanning electron microscope (manufactured by Hitachi, Ltd., "S-4100"). A SEM image of a powder (platinum unsupported) after firing at 1000° C. for 10 hr of Example 2 (or Example 3) is shown as one example of working examples in FIG. 1. FIG. 1 shows that the primary particle diameter was not more than 50 nm, and that the fine particle shape was maintained even after high-temperature crystallization treatment.

Optical Properties of Rhodium-Doped Strontium Titanate Particles

For the determination of optical properties of rhodium-doped strontium titanate prepared in Examples and Comparative Examples, an integrating sphere unit was mounted on a ultraviolet-visible-near infrared spectrophotometer to measure a diffusion reflection spectrum and to thereby determine a spectral reflectance R of the sample at each wavelength. In this case, the amount of the powder was regulated so that the absorbance A at a wavelength of 315 nm (=1−spectral reflectance R) was 0.86 to 0.87. Absorbances A at wavelengths of 570 nm and 1800 nm are summarized in Table 1.

Determination of Structure of Rhodium-Doped Strontium Titanate Particles

The $R_{sp}$ value of rhodium-doped strontium titanate particles was measured with a pulse NMR particle analyzer evaluation device ("Acorn area," manufactured by Nihon Rufuto Co., Ltd.) at room temperature. Specifically, 0.125 g of rhodium-doped strontium titanate particles prepared in Examples 1, 3 to 5, 7, 8, and 10, and Comparative Examples 4, 10, 13, and 15 was added to 2.375 g of a 0.23% AOT (di-2-ethylhexyl sodium sulfosuccinate) aqueous solution, and a pulse NMR sample was prepared by ultrasonic irradiation with a 20-W ultrasonic bath for 2 min. Next, immediately after ultrasonic irradiation, a sample introduced into a NMR tube was disposed in a coil between two permanent magnets, and, when the coil was excited by electromagnetic (RF) waves at about 13 MHz to generate a magnetic field, a temporal shift of magnetic field orientation of protons generated by the magnetic field in the sample was induced. When this induction was stopped, protons in the sample were again aligned with a static magnetic field $B_0$. This reorganization caused a lowering in voltage of the coil, called a free induction decay (FID), and T1 (longitudinal relaxation time) and T2 (transverse relaxation time) of the sample was measured from a specific pulse 1 sequence (a combination of the number of times of RF pulses and intervals of RF pulses). Here the mean value of five continuously measured relaxation time constant values, which are the inverse number of T2, was regarded as $R_{av}$. Likewise, $R_b$ of blankwater was separately measured, and $R_{sp}$ value was determined by the following equation.

$$R_{SP}=(R_b-R_{av})/R_b$$

The structure of rhodium-doped strontium titanate particles was determined from the $R_{sp}$ values thus obtained.

Results $R_{sp}$ values are shown in Table 1. In all of the Examples, the $R_{sp}$ value was not less than 0.88. The above results confirmed that rhodium-doped strontium titanate particles prepared in the Examples had a large interaction between the surface of the particles and water. Specifically, the results confirmed that the surface area of contact between the particle and water was large and the specific surface area of the particle was large.

TABLE 1

| Sample | Composition | Production process | Doping ratio of Rh | Firing temp. (° C.) | Dispersion treatment | Absorbance A @570 nm | Absorbance A @ 1800 nm | Primary particle diameter (nm) | Rsp value determined with pulse NMR |
|---|---|---|---|---|---|---|---|---|---|
| Example 1 | Rh-doped SrTiO3 | Heat decomposition of aqueous solution | 0.02 | 900 | Not done | 0.627 | 0.65 | 45 | 1.4 |
| Example 2 | Rh-doped SrTiO3 | Heat decomposition of aqueous solution | 0.02 | 1000 | Not done | 0.648 | 0.65 | 45 | 0.89 |
| Example 3 | Rh-doped SrTiO3 | Heat decomposition of aqueous solution | 0.02 | 1000 | Not done | 0.645 | 0.65 | 45 | 0.89 |
| Example 4 | Rh-doped SrTiO3 | Heat decomposition of aqueous solution | 0.02 | 1050 | Not done | 0.718 | 0.634 | 55 | 0.88 |
| Example 5 | Rh-doped SrTiO3 | Heat decomposition of aqueous solution | 0.01 | 1000 | Not done | 0.627 | 0.55 | 46 | 0.98 |
| Example 6 | Rh-doped SrTiO3 | Heat decomposition of aqueous solution | 0.03 | 1000 | Not done | 0.758 | 0.68 | 46 | 1.01 |
| Example 7 | Rh-doped SrTiO3 | Heat decomposition of aqueous solution | 0.02 | 1000 | Not done | 0.648 | 0.55 | 45 | 0.89 |
| Example 8 | Rh-doped SrTiO3 | Heat decomposition of aqueous solution | 0.02 | 1000 | Not done | 0.648 | 0.66 | 45 | 0.89 |
| Example 9 | Rh-doped SrTiO3 | Heat decomposition of aqueous solution | 0.02 | 1000 | Not done | 0.648 | 0.65 | 45 | 0.89 |
| Example 10 | Rh-doped SrTiO3 | Heat decomposition of aqueous solution | 0.02 | 1000 | Done | 0.621 | 0.694 | 45 | 1.5 |
| Example 11 | Rh-doped SrTiO3 | Heat decomposition of aqueous solution | 0.02 | 1000 | Not done | 0.648 | 0.65 | 48 | 0.89 |
| Example 12 | Rh-doped SrTiO3 | Heat decomposition of aqueous solution | 0.02 | 1000 | Not done | 0.755 | 0.551 | 65 | |
| Example 13 | Rh-doped SrTiO3 | Heat decomposition of aqueous solution | 0.02 | 1000 | Not done | 0.771 | 0.488 | 65 | |
| Comparative Example 1 | Rh-doped SrTiO3 | Solid-phase reaction method | 0.01 | 1000 | Not done | 0.723 | 0.49 | 180 | |
| Comparative Example 2 | Rh-doped SrTiO3 | Solid-phase reaction method | 0.01 | 1050 | Not done | 0.754 | 0.442 | 230 | |
| Comparative Example 3 | Rh-doped SrTiO3 | Solid-phase reaction method | 0.01 | 1100 | Not done | 0.778 | 0.396 | 250 | |
| Comparative Example 4 | Rh-doped SrTiO3 | Solid-phase reaction method | 0.02 | 1000 | Not done | 0.774 | 0.652 | 190 | 0.48 |
| Comparative Example 5 | Rh-doped SrTiO3 | Solid-phase reaction method | 0.02 | 1050 | Not done | 0.804 | 0.575 | 220 | |
| Comparative Example 6 | Rh-doped SrTiO3 | Solid-phase reaction method | 0.02 | 1100 | Not done | 0.8 | 0.594 | 280 | |
| Comparative Example 7 | Rh-doped SrTiO3 | Heat decomposition of aqueous solution | 0.02 | 500 | Not done | 0.668 | 0.629 | 40 | |
| Comparative Example 8 | Rh-doped SrTiO3 | Heat decomposition of aqueous solution | 0.02 | 600 | Not done | 0.522 | 0.693 | 30 | |
| Comparative Example 9 | Rh-doped SrTiO3 | Heat decomposition of aqueous solution | 0.02 | 700 | Not done | 0.525 | 0.716 | 30 | |
| Comparative | Rh-doped SrTiO3 | Heat decomposition | 0.02 | 800 | Not done | 0.538 | 0.677 | 40 | 1.47 |

TABLE 1-continued

| Sample | Composition | Production process | Doping ratio of Rh | Firing temp. (° C.) | Dispersion treatment | Absorbance A @570 nm | Absorbance A @ 1800 nm | Primary particle diameter (nm) | Rsp value determined with pulse NMR |
|---|---|---|---|---|---|---|---|---|---|
| Example 10 |  |  |  |  |  |  |  |  |  |
| Comparative Example 11 | Rh-doped SrTiO3 | Heat decomposition of aqueous solution | 0.02 | 1100 | Not done | 0.775 | 0.471 | 120 |  |
| Comparative Example 12 | Rh-doped SrTiO3 | Polymerized complex method | 0.02 | 1000 | Not done | 0.773 | 0.587 | 500 |  |
| Comparative Example 13 | Rh-doped SrTiO3 | Lactic acid polymerization method | 0.02 | 1000 | Not done | 0.665 | 0.856 | 300 | 0.85 |
| Comparative Example 14 | Rh-doped SrTiO3 | Heat decomposition of aqueous solution | 0.02 | 1000 | Not done | 0.819 | 0.444 | 100 |  |
| Comparative Example 15 | Rh-doped SrTiO3 | Heat decomposition of aqueous solution | 0.02 | 1000 | Not done | 0.662 | 0.65 | 80 | 0.82 |

Activity of Hydrogen Generation by Water Splitting of Rhodium-Doped Strontium Titanate Particles Hydrogen generation activity in splitting water by rhodium-doped strontium titanate particles prepared in Example 1 to 12 and Comparative Example 1, 4 and 10 to 15 under visible light irradiation was examined by the following method. In the measurement of the hydrogen generation activity in splitting water and in the measurement of the quantum yield, which is described later, where the two measurements were carried out under visible light irradiation, rhodium-doped strontium titanate particles with co-catalyst supported thereon in each Example was used.

Examples 1, 3 to 6, 10 and 12 and Comparative Examples 4 and 10 to 15

A powder (0.1 g) of rhodium-doped strontium titanate particles with 0.5% by weight of platinum as a co-catalyst supported thereon by a photoreduction method and 200 mL of an aqueous solution containing 10% by volume of methanol that serves as a sacrificial reagent were placed in a glass flask equipped with Pyrex (registered trademark) window (upper irradiation-type flasks were used for samples of Example 2 and Comparative Example 1, and side irradiation-type flasks were used for the other samples), followed by stirring with a stirrer to prepare a reaction solution. The glass flask with the reaction solution placed therein was mounted on a closed circulation device, and the reaction system was purged with argon. Visible light was applied from a Pyrex (registered trademark) window side through a 300-W xenon lamp (manufactured by Cermax, PE-300BF) equipped with a UV cutoff filter (L-42, manufactured by HOYA). The amount of hydrogen generated as a result of reduction of water by a photocatalytic reaction was determined by a gas chromatograph (manufactured by Shimadzu Seisakusho Ltd., GC-8A, TCD detector, MS-5A column) with the lapse of time. Here a powder of rhodium-doped strontium titanate particles with 0.5% by weight. of platinum supported thereon by a photoreduction method was prepared as follows. Specifically, 0.1 g of rhodium-doped strontium titanate particles, 0.132 g of an aqueous solution containing 1% by weight of chloroplatinic acid hexahydrate (manufactured by Wako Pure Chemical Industries, Ltd.) as a co-catalyst material, and 200 mL of ultrapure water containing 10% by volume of methanol as an oxidative sacrificial reagent were placed in a glass flask equipped with a Pyrex (registered trademark) window. Visible light was applied to the solution for 2 hr while stirring with a stirrer under an argon atmosphere from a Pyrex (registered trademark) window side through a 300-W xenon lamp (manufactured by Cermax, PE-300BF) equipped with a UV cutoff filter (L-42, manufactured by HOYA) to reduce chloroplatinic acid on the surface of the rhodium-doped strontium titanate particle and to support fine platinum particles on the surface of the rhodium-doped strontium titanate particles.

Example 2, Comparative Example 1

The same procedure of Example 1 was repeated except that 0.05 g of a powder of rhodium-doped strontium titanate particles with platinum as a co-catalyst supported thereon was used.

Example 7

The same procedure of Example 1 was repeated except that the amount of platinum as a co-catalyst was 0.75% by weight.

Example 8

The same procedure of Example 1 was repeated, except that an impregnation method instead of the photoreduction method was used as the method for supporting platinum as the co-catalyst. Specifically, a paste was prepared by kneading 0.1 g of the powder of rhodium-doped strontium titanate particles, 0.4 g of water, and 0.031 g of a 1 wt % chloroplatinic acid aqueous solution with an agate mortar at room temperature for 30 min. This paste was dried at room temperature for 15 hr and was then fired at 400° C. for 30 min to prepare a sample (impregnation method).

Example 9

The same procedure of Example 1 was repeated, except that ruthenium chloride n-hydrate (manufactured by Wako Pure Chemical Industries, Ltd.) was used, and that 0.5% by weight of ruthenium instead of platinum was supported by a photoreduction method.

Example 11

The same procedure of Example 1 was repeated, except that the amount of platinum as the co-catalyst was 1% by weight.

Results

Table 2 shows the amount of hydrogen (μmol) generated during a three-hr period from the start of light irradiation and a hydrogen generation rate per unit powder amount (μmol/ hr/g) for the powders of the rhodium-doped strontium titanate particles with the co-catalyst supported thereon.

For example, the sample of Example 2 had a hydrogen generation rate per unit powder amount of 759 μmol/hr/g, a very highly activity whereas, the sample of Comparative Example 1 had a hydrogen generation rate per unit powder amount of 120 μmol/hr/g, a very low activity. The samples of Examples 1 and 3 to 7 were also found to have a high hydrogen generation activity.

Quantum Yield by Water Decomposition of Rhodium-Doped Strontium Titanate Particles The quantum yield by visible light irradiation of rhodium-doped strontium titanate particles prepared in Example 3 was examined as follows. A powder (0.1 g) of rhodium-doped strontium titanate particles with 0.5% by weight of platinum supported thereon by a photoreduction method and 200 mL of an aqueous solution containing 10% by volume of methanol that served as a sacrificial reagent were placed in a glass flask equipped with a Pyrex (registered trademark) window to prepare a mixture, and the mixture was stirred with a stirrer to prepare a reaction solution. The glass flask containing the reaction solution was mounted on a closed circulation device, and the atmosphere within the reaction system was replaced by argon. Monochromatic light was applied from a Pyrex (registered trademark) window side through a wavelength variable monochromatic light source equipped with a spectrometer (manufactured by Bunkoukeiki Co., Ltd. SM-25F). The amount of hydrogen generated as a result of reduction of water by a photocatalytic reaction was determined by a gas chromatograph (manufactured by Shimadzu Seisakusho Ltd., GC-8A, TCD detector, MS-5A column) over time. Further, the quantum yield (%) was calculated by the following equation.

Quantum yield (%)=((number of molecules of hydrogen generated×2)/number of incident photonumber)×100 wherein the number of incident photonumber per unit wavelength was calculated by measuring an illuminance (W/cm$^2$/nm) at individual wavelengths (about 10 nm band wavelength width) with a spectroradiometer (manufactured by USHIO, USR-55) to divide energy that one photon at the wavelength has.

Figure 2:
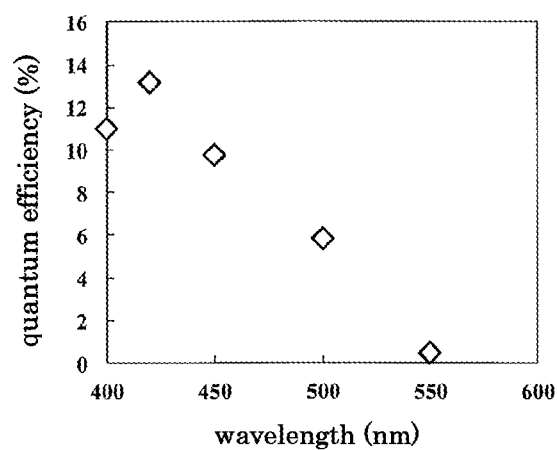
FIG. 2 is a diagram of the results of measurement of quantum yield by water splitting of rhodium-doped strontium titanate particles according to the present invention.

FIG. 2 shows the results. The quantum yield of the sample at 420 nm was 13.2%, demonstrating a very high hydrogen generation activity.

Figure 3:
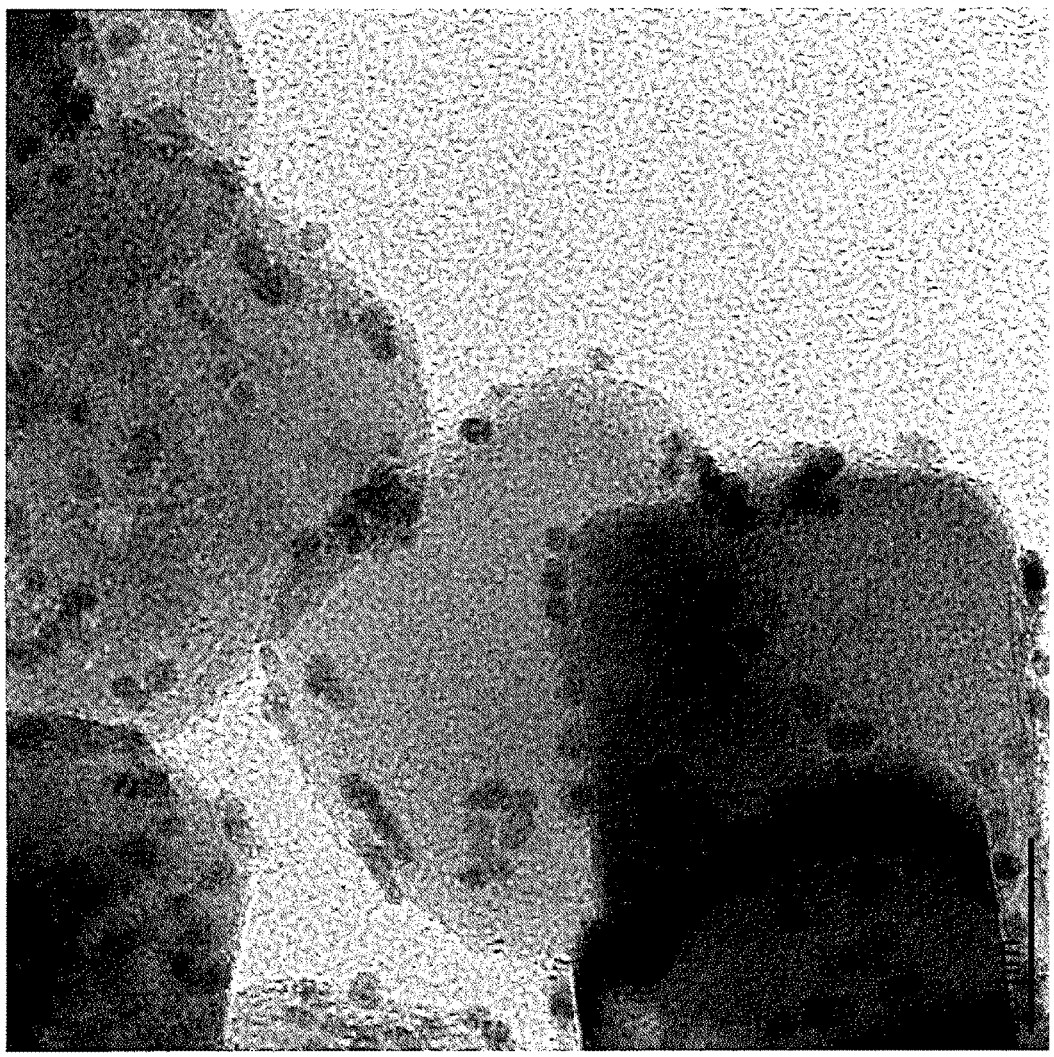
FIG. 3 is a transmission electron microscopic photograph of rhodium-doped strontium titanate particles according to the present invention.

A transmission electron microscopic image of particles of Example 2 with platinum supported thereon is shown in FIG. 3. FIG. 3 indicated that the particle was in the form of a cube having a length of each side of about 45 nm and had a cubic perovskite structure. Further, it indicated that the particle diameter of platinum supported by the photoreduction method was about 2 nm.

TABLE 2

| Sample | Composition | Production process | Co-catalyst metal | Amount of supported co-catalyst (wt %) | Co-catalyst supporting method | Amount of catalyst for hydrogen generation (g) | Amount of H2 generated 3 hr after light irradiation (μmol) | Hydrogen generatin rate per unit powder amount (μmol/hr/g) |
|---|---|---|---|---|---|---|---|---|
| Example 1 | Rh-doped SrTiO3 | Heat decomposition of aqueous solution | Pt | 0.5 | Photoreduction | 0.1 | 101 | 536 |
| Example 2 | Rh-doped SrTiO3 | Heat decomposition of aqueous solution | Pt | 0.5 | Photoreduction | 0.05 | 228 | 759 |
| Example 3 | Rh-doped SrTiO3 | Heat decomposition of aqueous solution | Pt | 0.5 | Photoreduction | 0.1 | 261 | 869 |
| Example 4 | Rh-doped SrTiO3 | Heat decomposition of aqueous solution | Pt | 0.5 | Photoreduction | 0.1 | 207 | 690 |
| Example 5 | Rh-doped SrTiO3 | Heat decomposition of aqueous solution | Pt | 0.5 | Photoreduction | 0.1 | 149 | 498 |
| Example 6 | Rh-doped SrTiO3 | Heat decomposition of aqueous solution | Pt | 0.5 | Photoreduction | 0.1 | 230 | 767 |
| Example 7 | Rh-doped SrTiO3 | Heat decomposition of aqueous solution | Pt | 0.75 | Photoreduction | 0.1 | 303 | 1011 |
| Example 8 | Rh-doped SrTiO3 | Heat decomposition of aqueous solution | Pt | 0.5 | Impregnation | 0.1 | 315 | 1050 |
| Example 9 | Rh-doped SrTiO3 | Heat decomposition of aqueous solution | Ru | 0.5 | Photoreduction | 0.1 | 140 | 467 |
| Example 10 | Rh-doped SrTiO3 | Heat decomposition of aqueous solution | Pt | 0.5 | Photoreduction | 0.1 | 173 | 577 |
| Example 11 | Rh-doped SrTiO3 | Heat decomposition of aqueous solution | Pt | 1 | Photoreduction | 0.1 | 198 | 660 |
| Example 12 | Rh-doped SrTiO3 | Heat decomposition of aqueous solution | Pt | 0.5 | Photoreduction | 0.1 | 141 | 470 |
| Example 13 | Rh-doped SrTiO3 | Heat decomposition of aqueous solution | | | | | | |
| Comparative Example 1 | Rh-doped SrTiO3 | Solid-phase reaction method | Pt | 0.5 | Photoreduction | 0.05 | 36 | 120 |
| Comparative Example 2 | Rh-doped SrTiO3 | Solid-phase reaction method | | | | | | |
| Comparative Example 3 | Rh-doped SrTiO3 | Solid-phase reaction method | | | | | | |
| Comparative Example 4 | Rh-doped SrTiO3 | Solid-phase reaction method | Pt | 0.5 | Photoreduction | 0.1 | 118 | 394 |
| Comparative Example 5 | Rh-doped SrTiO3 | Solid-phase reaction method | | | | | | |
| Comparative Example 6 | Rh-doped SrTiO3 | Solid-phase reaction method | | | | | | |
| Comparative | Rh-doped SrTiO3 | Heat decomposition | | | | | | |

TABLE 2-continued

| Sample | Composition | Production process | Co-catalyst metal | Amount of supported co-catalyst (wt %) | Co-catalyst supporting method | Amount of catalyst for hydrogen generation (g) | Amount of H2 generated 3 hr after light irradiation (μmol) | Hydrogen generatin rate per unit powder amount (μmol/hr/g) |
|---|---|---|---|---|---|---|---|---|
| Example 7 | | of aqueous solution | | | | | | |
| Comparative Example 8 | Rh-doped SrTiO3 | Heat decomposition of aqueous solution | | | | | | |
| Comparative Example 9 | Rh-doped SrTiO3 | Heat decomposition of aqueous solution | | | | | | |
| Comparative Example 10 | Rh-doped SrTiO3 | Heat decomposition of aqueous solution | Pt | 0.5 | Photoreduction | 0.1 | 37 | 123 |
| Comparative Example 11 | Rh-doped SrTiO3 | Heat decomposition of aqueous solution | Pt | 0.5 | Photoreduction | 0.1 | 37 | 123 |
| Comparative Example 12 | Rh-doped SrTiO3 | Polymerized complex method | Pt | 0.5 | Photoreduction | 0.1 | 0 | 0 |
| Comparative Example 13 | Rh-doped SrTiO3 | Lactic acid polymerization method | Pt | 0.5 | Photoreduction | 0.1 | 113 | 377 |
| Comparative Example 14 | Rh-doped SrTiO3 | Heat decomposition of aqueous solution | Pt | 0.5 | Photoreduction | 0.1 | 47 | 157 |
| Comparative Example 15 | Rh-doped SrTiO3 | Heat decomposition of aqueous solution | Pt | 0.5 | Photoreduction | 0.1 | 54 | 180 |

The invention claimed is:

1. Rhodium-doped strontium titanate particles having a primary particle diameter of not more than 70 nm and having
    an absorbance at a wavelength of 570 nm of not less than 0.6 and
    an absorbance at a wavelength of 1800 nm of not more than 0.7,
    each absorbance being determined by measuring a diffuse reflection spectrum, and
    a molar ratio represented by M (rhodium)/M (titanium+rhodium) of 0.001 to 0.03.

2. The rhodium-doped strontium titanate particles according to claim 1, wherein the primary particle diameter is not more than 50 nm.

3. The rhodium-doped strontium titanate particles according to claim 2, wherein the primary particle diameter is not less than 30 nm.

4. The rhodium-doped strontium titanate particles according to claim 1, wherein the absorbance at a wavelength of 570 nm is greater than or equal to 0.6 to less than 0.8.

5. The rhodium-doped strontium titanate particles according to claim 1, wherein the absorbance at a wavelength of 1800 nm is greater than or equal to 0.5 to less than or equal to 0.7.

6. The rhodium-doped strontium titanate particles according to claim 1, the rhodium-doped strontium titanate particles having an $R_{sp}$ value of not less than 0.86.

7. Photocatalysts for splitting water comprising the rhodium-doped strontium titanate particles according to claim 1.

8. A process for producing the rhodium-doped strontium titanate particles having a primary particle diameter of not more than 70 nm and having an absorbance at a wavelength of 570 nm of not less than 0.6 and an absorbance at a wavelength of 1800 nm of not more than 0.7, each absorbance being determined by measuring a diffuse reflection spectrum, comprising:
    providing a solution of a titanium compound, a rhodium compound, a strontium compound, and a hydrophobic complexing agent dissolved in water; and drying the solution to obtain a residue and firing the residue.

9. The process for producing the rhodium-doped strontium titanate particles according to claim 8, wherein the solution further comprises water dispersible organic polymer particles.

10. The process for producing the rhodium-doped strontium titanate particles according to claim 8, wherein the firing is carried out at a temperature of higher than 800° C. to lower than 1100° C.

11. A method for splitting water, comprising irradiating the rhodium-doped strontium titanate particles according to claim 1 with visible light, the rhodium-doped strontium titanate particles being in contact with water.

* * * * *